United States Patent
Noguchi

(10) Patent No.: US 11,738,751 B2
(45) Date of Patent: Aug. 29, 2023

(54) SPEED CONTROL DEVICE

(71) Applicant: TOYOTA JIDOSHA KABUSHIKI KAISHA, Toyota (JP)

(72) Inventor: Chiemi Noguchi, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 17/479,228

(22) Filed: Sep. 20, 2021

(65) Prior Publication Data

US 2022/0185281 A1    Jun. 16, 2022

(30) Foreign Application Priority Data

Dec. 16, 2020  (JP) ................... 2020-208359

(51) Int. Cl.
   *B60W 30/16*    (2020.01)

(52) U.S. Cl.
   CPC ..... *B60W 30/162* (2013.01); *B60W 2520/105* (2013.01); *B60W 2552/10* (2020.02); *B60W 2554/406* (2020.02); *B60W 2554/4041* (2020.02); *B60W 2554/4042* (2020.02);
   (Continued)

(58) Field of Classification Search
   CPC ......... B60W 30/162; B60W 2520/105; B60W 2552/10; B60W 2554/4041; B60W 2554/4042; B60W 2554/406; B60W 2554/801; B60W 2554/802; B60W 2720/106; B60W 40/02; B60W 40/105; B60W 30/143; B60W 2554/408;
   (Continued)

(56) References Cited

U.S. PATENT DOCUMENTS

2006/0047409 A1    3/2006  Oka
2017/0200371 A1*   7/2017  Glander ................. G08G 1/165
                           (Continued)

FOREIGN PATENT DOCUMENTS

JP    2006-069343 A      3/2006
JP    2009214838 A   *   9/2009
                      (Continued)

OTHER PUBLICATIONS

Sekiguchi Hiroyuki, Apr. 27, 2017, English Machine Translation_ JP2017077829A provided by Patent Translate by EPO and Google (Year: 2017).*

(Continued)

*Primary Examiner* — Peter D Nolan
*Assistant Examiner* — Ashley L Redhead, Jr.
(74) *Attorney, Agent, or Firm* — Dinsmore & Shohl LLP

(57) ABSTRACT

A speed control device sets a target speed of the own vehicle to a basic speed that is a set speed set in advance or sets the target speed of the own vehicle to a basic speed that is a speed equal to or less than the set speed in which a distance to a preceding vehicle is maintained at a predetermined distance or more when there is a preceding vehicle. The speed control device sets the target speed of the own vehicle to a correction speed instead of the basic speed when the speed control device determines that an adjacent lane is congested and a speed difference between the speed of the own vehicle and an average speed or a lowest speed of another vehicle in the adjacent lane is equal to or more than a first reference value.

10 Claims, 8 Drawing Sheets

(52) U.S. Cl.
CPC . *B60W 2554/801* (2020.02); *B60W 2554/802* (2020.02); *B60W 2720/106* (2013.01)

(58) Field of Classification Search
CPC ....... B60W 2554/4045; B62D 15/0255; B60T 8/17557; B60K 2310/266; B60Q 1/525
See application file for complete search history.

(56) References Cited

U.S. PATENT DOCUMENTS

| | | | |
|---|---|---|---|
| 2017/0232970 A1* | 8/2017 | Schaper | G08G 1/167 |
| | | | 701/36 |
| 2018/0043935 A1* | 2/2018 | Hashimoto | G08G 1/20 |
| 2018/0284266 A1* | 10/2018 | Talamonti | G08G 1/166 |
| 2018/0286242 A1* | 10/2018 | Talamonti | B62D 15/025 |
| 2018/0297611 A1* | 10/2018 | Fujisawa | G08G 1/167 |
| 2019/0291728 A1* | 9/2019 | Shalev-Shwartz | B60T 7/18 |
| 2020/0070834 A1* | 3/2020 | Mizoguchi | G08G 1/167 |
| 2020/0257294 A1* | 8/2020 | Ishioka | B60W 30/18163 |
| 2022/0101722 A1* | 3/2022 | Lee | G08G 1/163 |
| 2022/0144269 A1* | 5/2022 | Deborne | B60W 30/146 |
| 2022/0204047 A1* | 6/2022 | Mizoguchi | B60W 60/0059 |
| 2023/0018303 A1* | 1/2023 | Itou | B60W 60/00 |
| 2023/0040881 A1* | 2/2023 | Yamada | B60W 50/0097 |

FOREIGN PATENT DOCUMENTS

| | | | |
|---|---|---|---|
| JP | 2016-088133 A | | 5/2016 |
| JP | 2017-077829 A | | 4/2017 |
| JP | 2017077829 A | * | 4/2017 |

OTHER PUBLICATIONS

Sato Masayuki, Mar. 12, 2008, English Machine Translation_ JP2009214838A provided by Patent Translate by EPO and Google (Year: 2008).*

* cited by examiner

SPEED CONTROL DEVICE

CROSS-REFERENCE TO RELATED APPLICATION

This application claims priority to Japanese Patent Application No. 2020-208359 filed on Dec. 16, 2020, incorporated herein by reference in its entirety.

BACKGROUND

1. Technical Field

The present disclosure relates to a speed control device.

2. Description of Related Art

Conventionally, a speed control device of a vehicle having an adaptive cruise control (ACC) function is known, in which the ACC function controls the speed of the vehicle so that a distance to a preceding vehicle is maintained at a predetermined distance or more when the speed of the own vehicle is equal to or less than an upper limit speed set beforehand and there is the preceding vehicle (for example, Japanese Unexamined Patent Application Publication No. 2017-77829 (JP 2017-77829 A)). In particular, the speed control device described in JP 2017-77829 A is configured to control the speed and the course of the vehicle so that the vehicle slips through obstacles at a slip though speed set in accordance with ahead information of the own vehicle when there are obstacles on a traveling path of the own vehicle.

SUMMARY

By the way, there is a case in which the adjacent lane having the same traveling direction as the traveling lane of the own vehicle is congested although the traveling lane of the own vehicle is not congested, and the speed of the vehicle traveling in the adjacent lane is extremely slow. In such a case, if the control by the ACC function described above is performed, the own vehicle travels at a speed near the upper limit speed. For this reason, the relative speed between the own vehicle and the other vehicle traveling in the adjacent lane increases, and the occupants of the own vehicle may feel uneasy.

Thus, in view of the above problems, an object of the present disclosure is to suppress the occupant of the own vehicle from feeling uneasy due to the relative speed of the own vehicle and the other vehicle traveling in the adjacent lane being too large, when the speed of the own vehicle is automatically controlled.

The overview of this disclosure is as follows.
(1) A speed control device that automatically controls a speed of an own vehicle includes:

a basic speed setting unit that sets a target speed of the own vehicle to a basic speed that is a set speed set in advance or sets the target speed of the own vehicle to a basic speed that is a speed equal to or less than the set speed in which a distance to a preceding vehicle is maintained at a predetermined distance or more when there is a preceding vehicle;

a congestion determination unit that determines whether there is a congestion in an adjacent lane in which a traveling direction is the same as a traveling direction of a traveling lane of the own vehicle;

an adjacent vehicle speed detection unit that detects an average speed or a lowest speed of another vehicle traveling in the adjacent lane; and a correction speed setting unit that calculates a correction speed in which a speed difference is equal to or less than a first reference value when the congestion determination unit determines that the adjacent lane is congested and the speed difference between a speed of the own vehicle and the average speed or the lowest speed of the other vehicle in the adjacent lane that is congested is equal to or more than the first reference value, and sets the target speed of the own vehicle to the correction speed instead of the basic speed when the correction speed is slower than the basic speed.
(2) The speed control device described in (1), in which the first reference value is set to a value that is increased as the speed of the own vehicle is increased.
(3) The speed control device described in (1) or (2), in which the shorter an average lateral distance or a minimum lateral distance between the own vehicle and the other vehicle traveling in the adjacent lane, the smaller a value to which the first reference value is set.
(4) The speed control device described in any one of (1) to (3), in which the lower the average speed or the lowest speed of the other vehicle traveling in the adjacent lane, the smaller a value to which the first reference value is set.
(5) The speed control device described in any one of (1) to (4), in which the higher a traveling density of the other vehicle traveling in the adjacent lane, the smaller a value to which the first reference value is set.
(6) The speed control device described in any one of (1) to (5), in which an acceleration adjustment unit that lowers an acceleration or a jerk for accelerating the own vehicle, when the congestion determination unit determines that the adjacent lane is congested and the speed difference between the speed of the own vehicle and the average speed or the lowest speed of the other vehicle is equal to or more than a second reference value that is less than the first reference value, compared to when the adjacent lane is not congested or when the speed difference is less than the second reference value.
(7) The speed control device described in any one of (1) to (6), in which the correction speed is set so that the speed difference between the speed of the own vehicle and the average speed or the lowest speed of the other vehicle is a specified speed difference less than the first reference value.
(8) The speed control device described in (7), in which the higher the speed of the own vehicle, the larger a value to which the specified speed difference is set.
(9) The speed control device described in (7) or (8), in which the shorter an average lateral distance or a minimum lateral distance between the own vehicle and the other vehicle traveling in the adjacent lane, the smaller a value to which the specified speed difference is set.
(10) The speed control device described in any one of (7) to (9), in which the lower the average speed or the lowest speed of the other vehicle traveling in the adjacent lane, the smaller a value to which the specified speed difference is set.
(11) The speed control device described in any one of (7) to (10), in which the higher a traveling density of the other vehicle traveling in the adjacent lane, the smaller a value to which the specified speed difference is set.

According to the present disclosure, it is possible to suppress the occupant of the own vehicle from feeling uneasy due to the relative speed of the own vehicle and the other vehicle traveling in the adjacent lane being too large, when the speed of the own vehicle is automatically controlled.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments will be described in detail with reference to the drawings. In the following description, similar components are given the same reference numbers.

Figure 1:
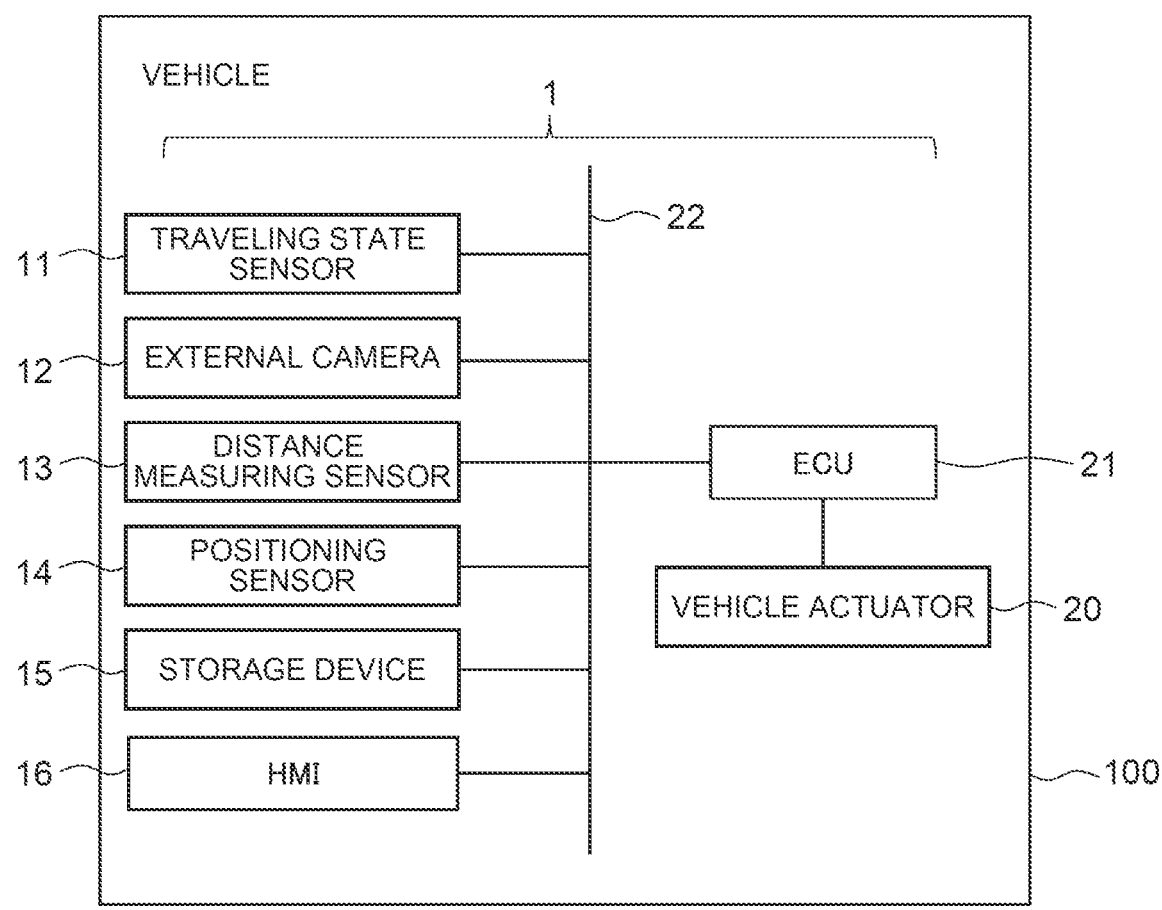
FIG. 1 is a block diagram schematically showing a vehicle in which a speed control device according to an embodiment is installed.

FIG. 1 is a block diagram schematically showing a vehicle 100 in which a speed control system 1 according to an embodiment is installed. The speed control system 1 is mounted on the vehicle 100 and automatically controls the speed of the vehicle 100 under predetermined conditions. In the present embodiment, the speed control system 1 includes a traveling state sensor 11, an external camera 12, a distance measuring sensor 13, a positioning sensor 14, a storage device 15, a human-machine interface (hereinafter referred to as an "HMI") 16, a vehicle actuator 20, and an electronic control unit (hereinafter, referred to as an "ECU") 21.

However, the speed control system 1 does not necessarily have all of these. For example, the speed control system 1 does not need to have the distance measuring sensor 13 as long as it has the external camera 12. Further, the speed control system 1 does not need to have the positioning sensor 14 and the storage device 15.

The traveling state sensor 11, the external camera 12, the distance measuring sensor 13, the positioning sensor 14, the storage device 15, the HMI 16, and the ECU 21 are communicably connected via an in-vehicle network 22. The in-vehicle network 22 is a network that conforms to standards such as a controller area network (CAN). The brake ECU 21 is connected to the vehicle actuator 20.

The traveling state sensor 11 is a sensor that detects a traveling state of the vehicle 100. The traveling state sensor 11 is an inertial measurement sensor for example, and detects the speed and the acceleration of the vehicle 100. The traveling state sensor 11 outputs the detection result of the traveling state of the vehicle to the ECU 21 via the in-vehicle network 22.

The external camera 12 captures the surroundings of the vehicle. The external camera 12 has a two-dimensional detector (CCD, C-MOS, and the like) constituted of an array of photoelectric conversion elements having sensitivity to visible light, and an imaging optical system forms an image of a region that is an imaging object on the two-dimensional detector. In the present embodiment, the external camera 12 is mounted inside the vehicle 100, for example, so as to face the front of the vehicle 100. The external camera 12 photographs a front region of the vehicle 100 at predetermined shooting cycles (for example, ⅟30 second to ⅟10 second), and generates an image in which the front region is captured. Each time the external camera 12 generates an image, the external camera 12 outputs the generated image to the ECU 21 via the in-vehicle network 22. The external camera 12 may be a monocular camera or a stereo camera. When a stereo camera is used as the external camera 12, the external camera 12 also functions as the distance measuring sensor 13. The vehicle 100 may be provided with a plurality of external cameras having different shooting directions or focal lengths.

The distance measuring sensor 13 is a sensor that measures the distance to an object present around the vehicle 100. In the present embodiment, the distance measuring sensor 13 can also measure the orientation of an object present around the vehicle 100. The distance measuring sensor 13 is, for example, a radar such as a millimeter wave radar or a light detection and ranging (LIDAR). In the present embodiment, the distance measuring sensor 13 measures the distance to an object present in front of and to the side of the vehicle. The distance measuring sensor 13 outputs the measurement result of the distance to the surrounding object to the ECU 21 via the in-vehicle network 22 at predetermined intervals.

A positioning sensor 14 is a sensor that detects the self position of the vehicle 100. The positioning sensor 14 is a global positioning system (GPS) receiver, for example. The GPS receiver receives GPS signals from a plurality of GPS satellites and measures the self position of the vehicle 100 based on the received GPS signals. The positioning sensor 14 outputs the measurement result of the self position of the vehicle 100 to the ECU 21 via the in-vehicle network 22 at predetermined intervals. The positioning sensor 14 may be a receiver conforming to another satellite positioning system as long as it can measure the self position of the vehicle 100.

The storage device 15 has, for example, a hard disk device or a non-volatile semiconductor memory. The storage device 15 stores map information. The map information includes information indicating a position of a section and a road marking (for example, a lane marking line or a stop line) for each predetermined section of a road. The storage device 15 reads the map information according to the request for reading the map information from the ECU 21, and transmits the map information to the ECU via the in-vehicle network 22.

The HMI 16 notifies the driver of the vehicle 100 of the notification information received from the ECU 21 via the in-vehicle network 22. Thus, the HMI 16 functions as a notification device that notifies the driver of information. Specifically, the HMI 16 includes, for example, a display device such as a liquid crystal display, a meter such as a speedometer, a warning light, and a speaker. Further, the HMI 16 receives the input from an occupant and transmits the received input to the ECU 21 via the in-vehicle network 22. Thus, the HMI 16 functions as an input device that receives input from an occupant or a driver. Specifically, the HMI 16 has a touch panel, switches, buttons and a remote controller. The HMI 16 is provided, for example, on an instrument panel.

The vehicle actuator 20 is an actuator used to control the operation of the vehicle 100. Specifically, the vehicle actuator 20 includes, for example, a drive actuator that controls an internal combustion engine or a motor for driving the vehicle 100, and a braking actuator that controls brakes that brakes the vehicle 100. The vehicle actuator 20 may have a steering actuator that controls the steering of the vehicle 100. The vehicle actuator 20 controls acceleration and braking of the vehicle 100 in accordance with a control signal transmitted from the ECU 21 via a signal line, and controls steering of the vehicle 100 when the vehicle 100 has a steering actuator.

Figure 2:
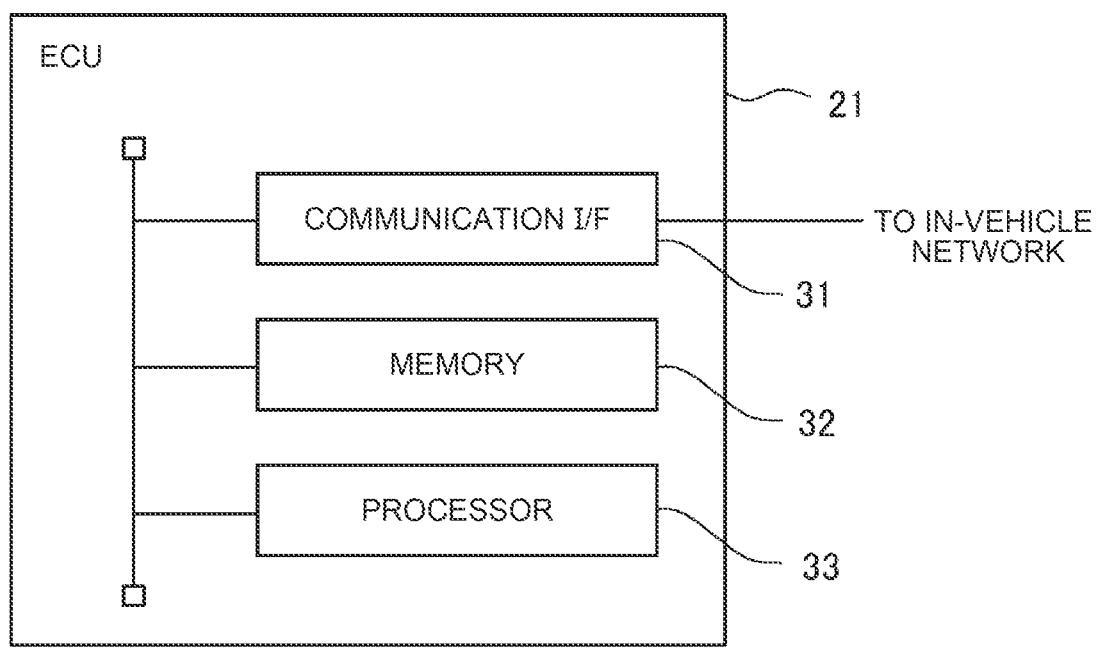
FIG. 2 is a hardware configuration diagram of an ECU that is an embodiment of a driving support control device.

FIG. 2 is a hardware configuration diagram of an ECU 21 that is an embodiment of a driving support control device. The ECU 21 has a communication interface 31, a memory 32, and a processor 33. The communication interface 31, the memory 32, and the processor 33 may be separate circuits, or may be configured as one integrated circuit.

The communication interface 31 has a communication interface circuit and a device interface circuit. The communication interface circuit is a circuit for connecting the ECU 21 to the in-vehicle network 22. The equipment interface circuit is a circuit for outputting a control signal to the vehicle actuator 20.

Each time the communication interface 31 receives the detection result of the traveling state of the vehicle 100 from the traveling state sensor 11, the communication interface 31 transmits the received detection result to the processor 33. Further, each time an image is received from the external camera 12, the received image is transmitted to the processor 33. In addition, each time the communication interface 31 receives the measurement result of the distance from the distance measuring sensor 13 to the object around the vehicle, the communication interface 31 transmits the measurement result to the processor 33. Further, each time the communication interface 31 receives the measurement result of the self position from the positioning sensor 14, the communication interface 31 transmits the measurement result to the processor 33. Further, the communication interface 31 transmits the high-precision map read from the storage device 15 to the processor 33. In addition, the communication interface 31 transmits the input signal to the processor 33 each time the occupant's input signal is received from the HMI 16. Further, each time the communication interface 31 receives the notification information from the ECU 21, the communication interface 31 transmits the received information to the HMI 16. In addition, each time the communication interface 31 receives a control signal from the ECU 21 to the vehicle actuator 20, the communication interface 31 transmits the received control signal to the vehicle actuator 20.

The memory 32 is a storage device that stores data. The memory 32 includes, for example, a volatile semiconductor memory and a non-volatile semiconductor memory. The memory 32 stores a program of a driving support process that is executed by the processor 33 of the ECU 21. Further, the memory 32 stores the image taken by the external camera 12, the operation information on the driver, the measurement result of the distance to the object around the vehicle, the measurement result of the self position, the input information on the occupant, various data used in the speed control process, and the like.

The processor 33 has one or a plurality of central processing units (CPUs) and peripheral circuits thereof. The processor 33 may further include other arithmetic circuits such as a logical operation unit or a numerical operation unit. The processor 33 executes the control process of the vehicle actuator 20 to control the vehicle actuator 20. In the present embodiment, the processor 33 functions as a speed control device that automatically controls the speed of the vehicle 100.

Overview of Speed Control

Hereinafter, the speed control of the vehicle 100 by the speed control device according to each embodiment of the present disclosure will be described. First, the basic speed control of the vehicle 100 by the speed control device according to the present embodiment will be described. In the speed control device according to the present embodiment, when the driver selects automatic speed control via the HMI 16, the vehicle 100 automatically controls the speed of the vehicle 100 even if there is no accelerator operation or brake operation by the driver. Further, the ECU 21 of the vehicle 100 may perform steering control of the vehicle 100 so that the vehicle 100 automatically travels along the lane in which the vehicle 100 is currently traveling.

In the speed control device, in the basic speed control, the target speed of the vehicle 100 is set as the basic speed. The basic speed is set to a set speed beforehand when there is no preceding vehicle in the traveling lane in which the vehicle 100 is traveling. Thus, when the preceding vehicle does not exist, the speed control device accelerates the vehicle 100 toward the set speed when the speed of the vehicle 100 is lower than the set speed, and decelerates the vehicle 100 toward the set speed when the speed of the vehicle 100 is higher than the set speed.

Further, the basic speed is set to a speed at which the distance to the preceding vehicle is maintained at a preset predetermined distance when the preceding vehicle is present in the traveling lane in which the vehicle 100 is traveling. Thus, the speed control device decelerates the vehicle 100 so that the distance to the preceding vehicle increases when the distance to the preceding vehicle is closer than the predetermined distance, and accelerates the vehicle 100 so that the distance to the preceding vehicle is decreased when the distance to the preceding vehicle is farther from the predetermined distance. However, when the speed of the preceding vehicle is faster than the set speed described above, the speed of the vehicle 100 is maintained at the set speed regardless of the distance to the preceding vehicle.

Figure 3:
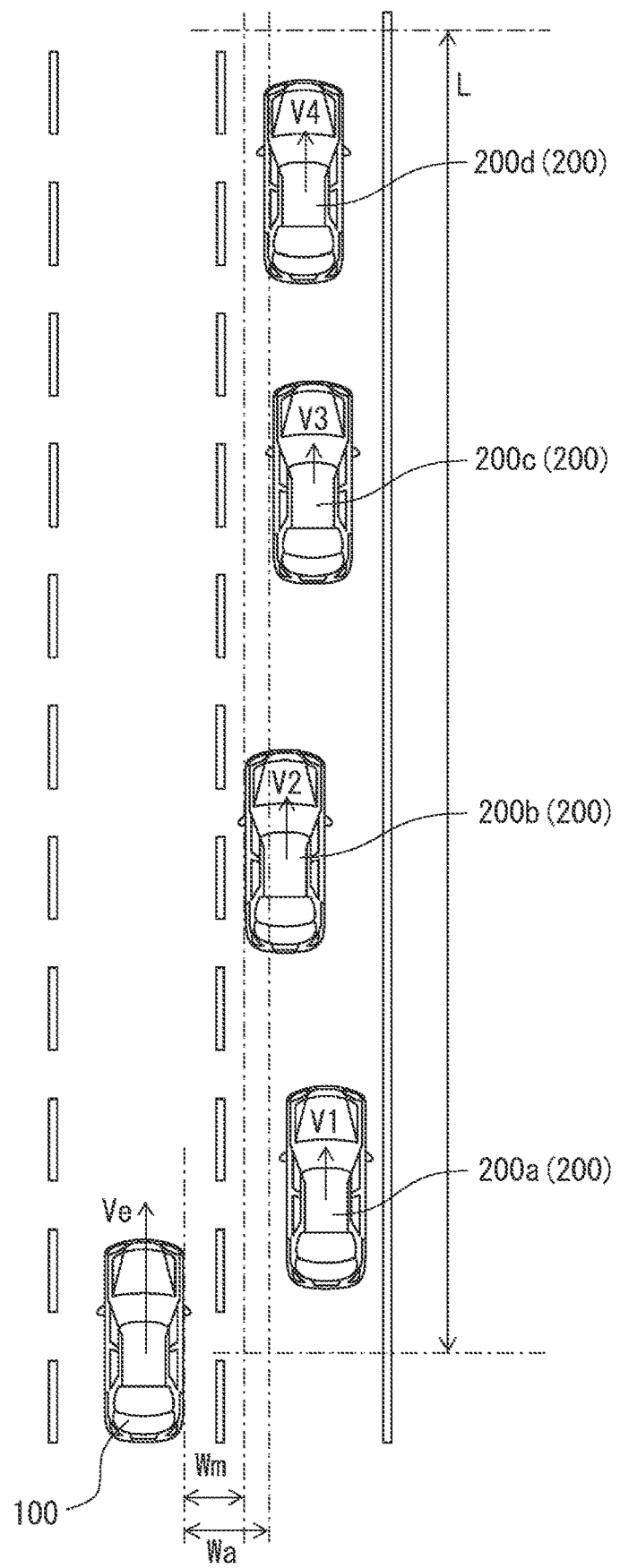
FIG. 3 is a diagram showing a state in which a plurality of vehicles are traveling on a road having three lanes on each side.

Next, with reference to FIG. 3, the speed control when an adjacent lane adjacent to the traveling lane of the vehicle 100 is congested will be described. FIG. 3 is a diagram showing a state in which a plurality of vehicles are traveling on a road having three lanes on each side. In particular, FIG. 3 shows a state in which a vehicle (hereinafter referred to as an "own vehicle") 100 on which the speed control system 1 according to the present embodiment is mounted is traveling in a central lane, and vehicles (hereinafter referred to as "other vehicles") other than the own vehicle 100 are traveling in a right lane (the adjacent lane of the lane in which the own vehicle is traveling). In particular, in the example shown in FIG. 3, the other vehicles in the right lane are traveling at a slower speed due to congestion.

Here, when the speed control device performs the above-mentioned basic speed control, in the situation shown in FIG. 3, the basic speed of the own vehicle 100 is such that the preceding vehicle is set to the set speed since there is no preceding vehicle in the lane in which the own vehicle 100 is traveling. Thus, the own vehicle 100 travels at a speed close to the set speed.

However, in the situation shown in FIG. 3, the speed of the other vehicles 200 traveling in the right lane is slow as described above. Thus, the own vehicle 100 travels immediately beside the other vehicles 200 at a high relative speed with respect to the other vehicles 200, and the driver may feel uneasy.

Thus, the speed control device according to the present embodiment can be constituted so as to decrease the speed of the own vehicle when the speed difference between the speed of the own vehicle 100 and the speed of the other vehicles 200 traveling in the adjacent lane while the adjacent lane is congested is large.

Specifically, the speed control device first determines whether the adjacent lane is congested. The presence or absence of congestion in the adjacent lane is, for example, determined based on the number of the other vehicles 200 present in a region (hereinafter referred to as a "proximity region" and is a region L in FIG. 3) on the adjacent lane from a position of the own vehicle 100 to a position ahead by a predetermined distance. Alternatively, the speed control device may determine whether there is congestion in the adjacent lane based on an average speed or a lowest speed of the vehicles traveling in the proximity region of the adjacent lane, in addition to the number of vehicles present in the proximity region.

In addition, the speed control device detects the speed of the other vehicles 200 traveling in the adjacent lane. The speed control device may detect the average speed of the other vehicle 200 traveling in the proximity region of the adjacent lane (in the example shown in FIG. 4, the speeds V1, V2, V3, and V4 of the other vehicles 200a, 200b, 200c, 200d), or the lowest speed among the speeds of the other vehicles 200 traveling in the proximity region of the adjacent lane (in the example shown in FIG. 4, the speed V3 of the other vehicle 200c that is the slowest among the other vehicles 200a, 200b, 200c, 200d).

Then, when the speed difference between the speed of the other vehicles 200 detected in this way and a speed Ve of the own vehicle 100 is equal to or more than a predetermined reference value, the speed control device changes the target speed to a correction speed so that the speed difference is equal to or less than the reference value. As a result, the speed of the own vehicle 100 is controlled so that the speed difference between the own vehicle 100 and the other vehicles 200 becomes smaller than the current speed difference.

Specific Control

Figure 4:
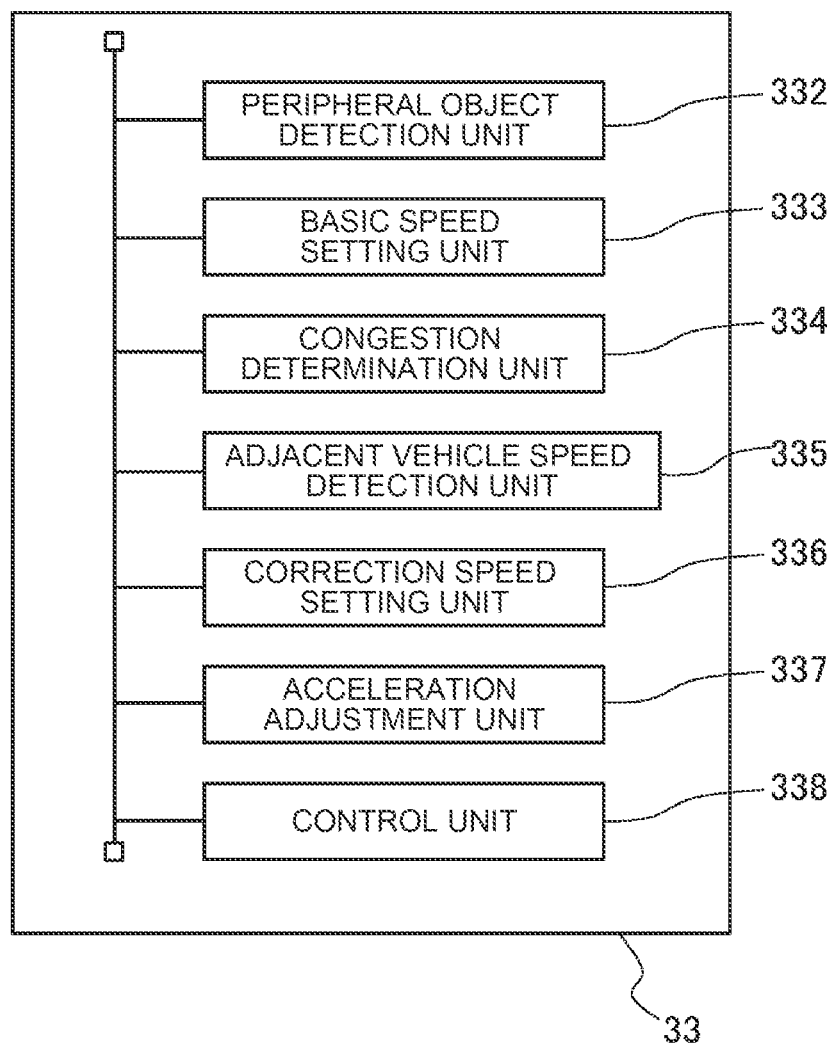
FIG. 4 is a functional block diagram of a processor of an own vehicle.

Next, the specific control will be described with reference to FIG. 4 to FIG. 8. FIG. 4 is a functional block diagram of the processor 33 of the own vehicle 100. As shown in FIG. 4, the processor 33 includes a peripheral object detection unit 332, a basic speed setting unit 333, a congestion determination unit 334, an adjacent vehicle speed detection unit 335, a correction speed setting unit 336, an acceleration adjustment unit 337, and a control unit 338. These functional blocks included in the processor 33 are, for example, functional modules realized by a computer program running on the processor 33. Alternatively, these functional blocks included in the processor 33 may be a dedicated arithmetic circuit provided in the processor 33.

The peripheral object detection unit 332 detects the type, position, speed, and the like of the objects present around the own vehicle 100. For example, an image taken by the external camera 12 and a distance to surrounding objects measured by the distance measuring sensor 13 are input to the peripheral object detection unit 332. The peripheral object detection unit 332 recognizes the objects around the own vehicle 100 shown in this image by the image recognition process. As the image recognition process, a known pattern recognition method such as a neural network or a support vector machine is used. In addition, the distance information to the surrounding objects measured by the distance measuring sensor 13 is input to the peripheral object detection unit 332. By using the recognition result of the surrounding objects using the image and the distance information to the surrounding objects, the peripheral object detection unit 332 detects the types, positions, and the like of the objects present around the own vehicle 100 and also detects the speeds of these object based on the change in the positions in time series, and outputs the detection result to a driving support control unit 43. In particular, the peripheral object detection unit 332 detects the other vehicles 200 (preceding vehicles) traveling ahead of the own vehicle 100 on the traveling lane of the own vehicle 100 and other vehicles 200 traveling in the adjacent lane adjacent to the traveling lane of the own vehicle 100, and detects the speeds of these other vehicles 200.

The basic speed setting unit 333 sets the target speed of the own vehicle 100 as the basic speed. The basic speed is set to the preset speed that is set beforehand or a speed equal to or less than the set speed in which the distance to the preceding vehicle is maintained at the predetermined distance or more when there is a preceding vehicle.

Figure 5:
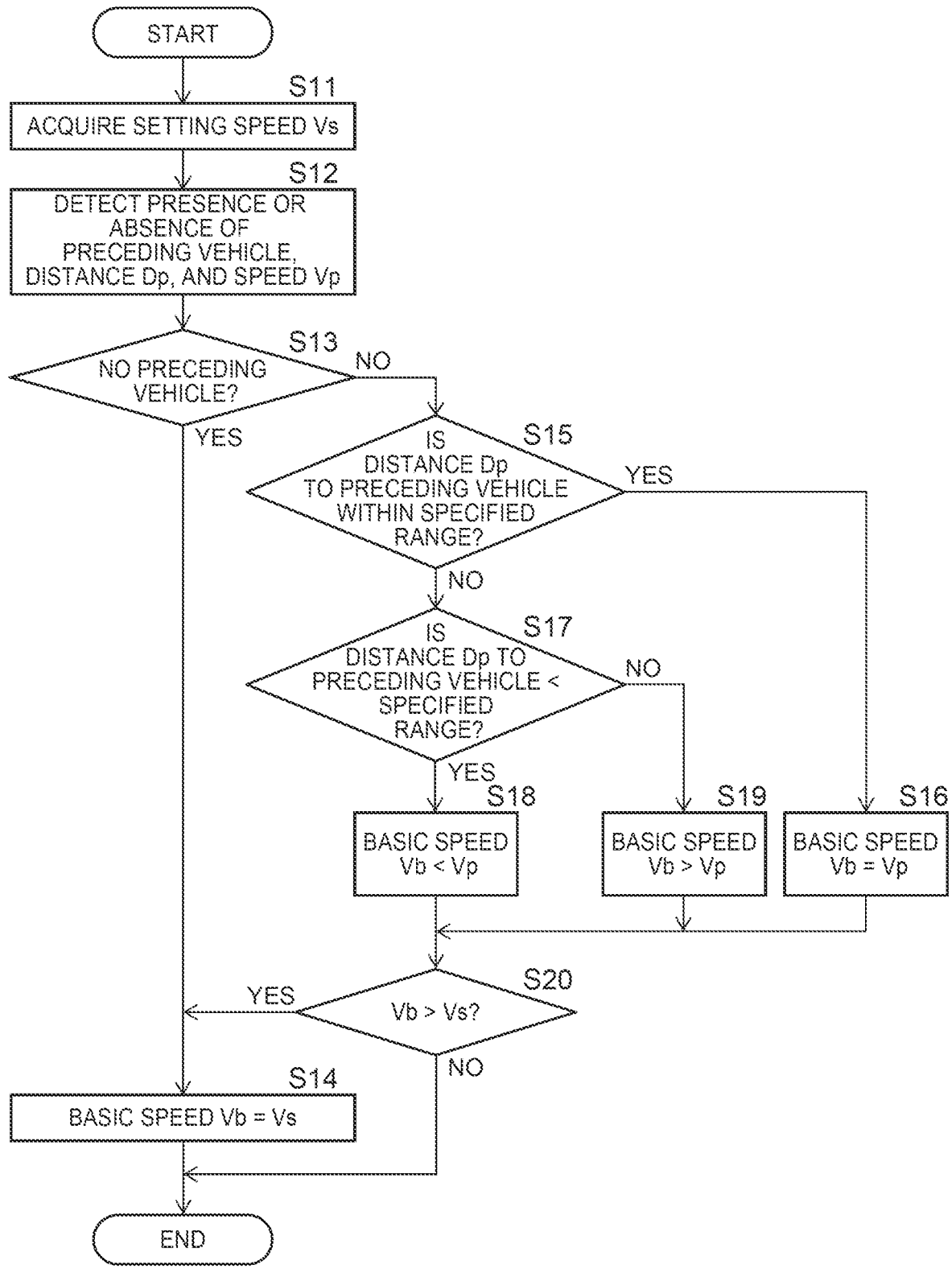
FIG. 5 is a flowchart showing a flow of a basic speed setting process for setting a basic speed that is performed by a basic speed setting unit.

FIG. 5 is a flowchart showing a flow of a basic speed setting process for setting the basic speed that is performed by the basic speed setting unit 333. The process that is shown is repeatedly executed at predetermined time intervals.

As shown in FIG. 5, first, the basic speed setting unit 333 acquires a set speed Vs set by the driver (step S11). The set speed is set by the driver, for example, via the HMI 16. In this case, the set speed is, for example, a fixed value set by the driver. Alternatively, the set speed may be a value that changes according to the state of a traffic light on the road on which the own vehicle 100 is scheduled to travel, the speed limit set on the road on which the vehicle is traveling, or the like.

Next, the basic speed setting unit 333 acquires information on the other vehicles 200 present around the own vehicle 100 from the peripheral object detection unit 332. In addition, based on the acquired information on the other vehicles 200 in the vicinity, the basic speed setting unit 333 detects the presence or absence of a preceding vehicle traveling in the same traveling lane as the own vehicle 100, and when the preceding vehicle is present, the basic speed setting unit 333 detects the position (distance between the own vehicle 100 and the preceding vehicle) and speed of the preceding vehicle (step S12).

Lane information is acquired, for example, by recognizing a lane marking by image recognition processing from an image taken by the external camera 12. Alternatively, the lane information may be acquired based on the map information stored in the storage device 15 and the self position measured by the positioning sensor 14. The basic speed setting unit 333 acquires whether there is a preceding vehicle traveling in the same lane and the position and speed of the preceding vehicle based on the lane information thus acquired and the information on the other surrounding vehicles 200 acquired by the peripheral object detection unit 332.

Next, the basic speed setting unit 333 determines whether there is a preceding vehicle (step S13). When it is determined in step S13 that there is no preceding vehicle, the basic speed setting unit 333 sets a basic speed Vb of the own vehicle 100 to the set speed Vs set by the driver (step S14).

In contrast, when it is determined in step S13 that there is a preceding vehicle, the basic speed setting unit 333 determines whether a distance Dp between the own vehicle 100 and the preceding vehicle is within a predetermined range (step S15). The predetermined range represents the range of an appropriate inter-vehicle distance between the own vehicle 100 and the preceding vehicle. The predetermined range may be a predetermined fixed range, or may be a range that changes in accordance with to the speed or the like of the own vehicle 100.

When it is determined in step S15 that the distance Dp between the own vehicle 100 and the preceding vehicle is within the predetermined range, the basic speed setting unit 333 sets the basic speed Vb to substantially the same speed as the speed Vp of the preceding vehicle (step S16). As a result, the speed of the own vehicle 100 is controlled to be equal to the speed of the preceding vehicle, so that the own vehicle 100 follows the preceding vehicle and travels.

In contrast, when it is determined in step S15 that the distance Dp between the own vehicle 100 and the preceding vehicle is out of the predetermined range, the basic speed setting unit 333 determines whether the distance between the own vehicle 100 and the preceding vehicle is smaller than the predetermined range (step S17). When it is determined in step S17 that the distance to the preceding vehicle is smaller than the above-mentioned predetermined range, the basic speed setting unit 333 sets the basic speed Vb to a speed slower than a speed Vp of the preceding vehicle (step S18). The shorter the distance Dp between the own vehicle 100 and the preceding vehicle, the slower the basic speed Vb at this time is set, for example. As a result, it is possible to suppress the own vehicle 100 from getting too close to the preceding vehicle. In contrast, when it is determined in step S17 that the distance to the preceding vehicle is larger than the above-mentioned predetermined range, the basic speed setting unit 333 sets the basic speed Vb to a speed faster than the speed Vp of the preceding vehicle (step S19). The longer the distance Dp between the own vehicle 100 and the preceding vehicle, the slower the basic speed Vb at this time is set, for example. As a result, it is possible to suppress the own vehicle 100 from being too far from the preceding vehicle.

After that, the basic speed setting unit 333 determines whether the basic speed Vb once set in steps S16, S18, or S19 is higher than the set speed Vs (step S20). If it is determined in step S20 that the once set basic speed Vb is equal to or less than the set speed Vs, the basic speed Vb is set to the value as it is. In contrast, if it is determined in step S20 that the basic speed Vb once set is higher than the set speed Vs, the basic speed setting unit 333 sets the basic speed Vb to the set speed Vs (step S14). As a result, the target speed of the own vehicle 100 is maintained at the set speed Vs or less even when the preceding vehicle is in the same lane as the own vehicle 100. In other words, the basic speed Vb is set to a speed equal to or less than the set speed in which the distance Dp between the own vehicle 100 and the preceding vehicle is maintained within the predetermined range or more, that is, this distance is maintained at the predetermined distance or more, when there is a preceding vehicle.

The congestion determination unit 334 determines whether the adjacent lane is congested. Specifically, the congestion determination unit 334 first acquires information on the other vehicles 200 present around the own vehicle 100 from the peripheral object detection unit 332, and also acquires the lane information from an image or the like taken by the external camera 12. Then, the congestion determination unit 334 determines that the adjacent lane is congested when the number of other vehicles 200 present in the above-mentioned proximity region is larger than a preset reference number, and determines that the adjacent lane is not congested when the number of other vehicles 200 present in the above-mentioned proximity region is equal to or less than the reference number. The congestion determination unit 334 may determine the presence or absence of congestion in the adjacent lane based on a parameter other than the number of other vehicles 200 present in the proximity region.

The adjacent vehicle speed detection unit 335 detects the average speed of the other vehicles 200 traveling in the adjacent lane. Specifically, the adjacent vehicle speed detection unit 335 acquires information on the other vehicles 200 and the lane information in the same manner as the congestion determination unit 334. Then, the adjacent vehicle speed detection unit 335 detects the speed of the other vehicles 200 traveling in the above-mentioned proximity region of the adjacent lane that is determined to be congested by the congestion determination unit 334. That is, the adjacent vehicle speed detection unit 335 identifies the other vehicles 200 traveling in the proximity region of the adjacent lane, and also specifies the speed of the specified other vehicles 200 based on the information on the other vehicles 200. The adjacent vehicle speed detection unit 335 detects the average speed of the other vehicles 200 by acquiring the average of the speeds of the other vehicles 200 traveling in the adjacent lane thus specified. The adjacent vehicle speed detection unit 335 may detect the lowest speed of the other vehicles 200 traveling in the proximity region of the adjacent lane in which there is congestion.

When it is determined that the adjacent lane is congested and that the speed difference between the speed of the own vehicle 100 and the average speed of the other vehicles 200 traveling in the adjacent lane is equal to or more than the reference value, the correction speed setting unit 336 sets the target speed of the own vehicle 100 to the correction speed instead of the basic speed, in which the correction speed is set so that the speed difference is equal to or less than the reference value. However, when the correction speed that is set such that the speed difference becomes equal to or less than the reference value is faster than the basic speed, the correction speed setting unit 336 maintains the basic speed without correcting the target speed. Thus, the correction speed setting unit 336 sets the target speed of the own vehicle 100 to the correction speed when the correction speed is slower than the basic speed.

Figure 6:
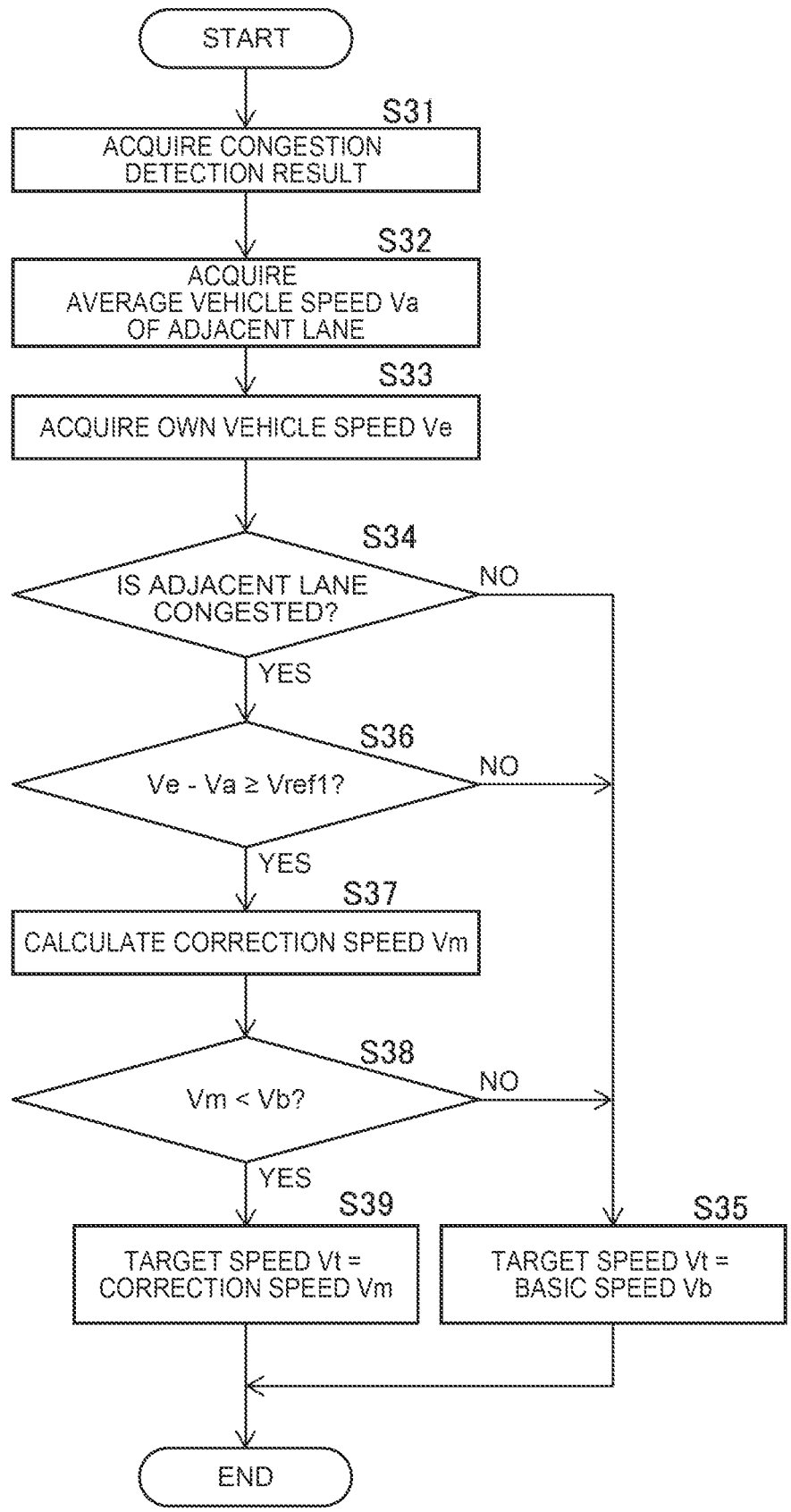
FIG. 6 is a flowchart showing a flow of a correction speed setting process for setting a correction speed that is performed by a correction speed setting unit.

FIG. 6 is a flowchart showing a flow of a correction speed setting process for setting the correction speed that is performed by the correction speed setting unit 336. The process that is shown is repeatedly executed at predetermined time intervals.

As shown in FIG. 6, first, the correction speed setting unit 336 acquires the congestion determination result from the congestion determination unit 334 (step S31). Next, the correction speed setting unit 336 acquires the average speed Va of the other vehicles 200 traveling in the adjacent lane from the adjacent vehicle speed detection unit 335 (step S32). After that, the correction speed setting unit 336 acquires the current speed Ve of the own vehicle 100 from the traveling state sensor 11 (step S33).

When the correction speed setting unit 336 acquires various data in this way, it determines whether the adjacent lane is congested based on the congestion determination result of the congestion determination unit 334 (step S34). When it is determined in step S34 that the adjacent lane is not congested, the correction speed setting unit 336 maintains a target speed Vt of the own vehicle 100 as it is without correcting it from the basic speed Vb (step S35).

In contrast, when it is determined in step S34 that the adjacent lane is congested, the correction speed setting unit 336 determines whether a speed difference ($\Delta V = Ve - Va$) is equal to or more than a first reference value Vref1, in which the speed difference is obtained by subtracting the average speed Va of the other vehicles 200 acquired in step S32 from the speed Ve of the own vehicle 100 (step S36).

The first reference value Vref1 is a value such that the driver's uneasiness increases as the speed difference becomes larger than that. The first reference value Vref1 changes in accordance with the values of various parameters. Specifically, the first reference value Vref1 changes in accordance with the speed of the own vehicle 100, the lateral distance to the other vehicles 200 traveling in the adjacent lane, the speed of the other vehicles 200 traveling in the adjacent lane, and the traveling density of the other vehicles traveling in the adjacent lane.

More specifically, the first reference value Vref1 may be set to a larger value as the speed of the own vehicle 100 is increased. This is because when the speed of the own vehicle 100 is high while traveling on a highway or the like, the driver's uneasiness about the speed difference tends to decrease. Further, the shorter the average lateral distance (Wa in FIG. 3) between the other vehicles 200 and the own vehicle 100 traveling in the proximity region in the adjacent lane, the smaller the value to which the first reference value Vref1 is set may be. Alternatively, the shorter the lateral distance (shortest lateral distance, Wm in FIG. 3) between the own vehicle 100 and the other vehicle 200 with the shortest lateral distance to the own vehicle 100 among the other vehicles 200 traveling in the proximity region in the adjacent lane, the smaller the value to which the first reference value Vref1 is set may be. This is because the shorter the lateral distance to the other vehicles 200 traveling in the adjacent lane, the greater the driver's uneasiness about the speed difference. In addition, the lower the average speed of the other vehicles 200 traveling in the adjacent lane in the proximity region or the lowest speed among the speeds of the other vehicles 200, the smaller the value to which the first reference value Vref1 is set may be. This is because the slower the speed of the other vehicles 200, the greater the driver's uneasiness about the speed difference tends to be. Further, the higher the traveling density in the proximity region of the other vehicles 200 traveling in the adjacent lane (the number of other vehicles 200 present in the proximity region), the smaller the value to which the first reference value Vref1 is set may be. This is because the higher the degree of congestion in the adjacent lane, the greater the driver's uneasiness about the speed difference tends to be. The first reference value Vref1 may be a predetermined fixed value.

When it is determined in step S36 that a speed difference ΔV is smaller than the first reference value Vref1, the correction speed setting unit 336 maintains the target speed Vt of the own vehicle 100 at the basic speed Vb (step S35). In contrast, when it is determined in step S36 that the speed difference ΔV is equal to or more than the first reference value Vref1, the correction speed setting unit 336 calculates a correction speed Vm (step S37). The correction speed Vm is calculated as a speed at which the speed difference between the speed of the own vehicle 100 and the speed of the other vehicles 200 traveling in the adjacent lane is a specified speed difference equal to or less than the first reference value Vref1.

The specified speed difference is a value that makes the driver feel uneasy when the speed difference becomes equal to or more than the specified speed difference. The specified speed difference changes according to the values of various parameters. Specifically, similar to the first reference value Vref1, the specified speed difference changes in accordance with the speed of the own vehicle 100, the lateral distance to the other vehicles 200 traveling in the adjacent lane, the speed of the other vehicles 200 traveling in the adjacent lane, and the traveling density of the other vehicles traveling in the adjacent lane.

Thus, the specified speed difference may be set to a larger value as the speed of the own vehicle 100 is increased. Further, the shorter the average lateral distance (Wa in FIG. 3) between the other vehicles 200 and the own vehicle 100 traveling in the proximity region in the adjacent lane or the minimum lateral distance, the smaller the value to which the specified speed difference is set may be. In addition, the lower the average speed of the other vehicles 200 traveling in the adjacent lane in the proximity region or the lowest speed among the speeds of the other vehicles 200, the smaller the value to which the specified speed difference is set may be. Further, the higher the traveling density in the proximity region of the other vehicles 200 traveling in the adjacent lane (the number of other vehicles 200 present in the proximity region), the smaller the value to which the specified speed difference is set may be. The specified speed difference may be a predetermined fixed value. Further, the specified speed difference may be the same as the first reference value Vref1.

When the correction speed Vm is calculated in step S37, the correction speed setting unit 336 determines whether the calculated correction speed Vm is lower than the basic speed Vb (step S38). When it is determined in step S38 that the correction speed Vm is equal to or more than the basic speed Vb, the correction speed setting unit 336 maintains the target speed Vt as the basic speed Vb (step S35). In contrast, when it is determined in step S38 that the correction speed Vm is lower than the basic speed Vb, the correction speed setting unit 336 sets the target speed Vt to the correction speed Vm calculated in step S37 (step S39). Thus, in this case, the target speed Vt is corrected from the basic speed Vb to the correction speed Vm.

As described above, in the present embodiment, when the adjacent lane is congested and the speed difference ΔV between the average speed Va of the vehicles traveling in the adjacent lane and the speed Ve of the own vehicle is the first reference value Vref1 or more, the target speed Vt of the own vehicle 100 is set to the correction speed Vm such that the speed difference ΔV is equal to or less than the first reference value Vref1. Further, when the correction speed Vm is faster than the basic speed Vb, the target speed is maintained at the basic speed Vb. Thus, the speed difference ΔV between the average speed Va of the other vehicles 200 traveling in the adjacent lane and the speed Ve of the own vehicle 100 can be suppressed to a low level. As a result, it is possible to suppress the occupants of the own vehicle 100 from feeling uneasy due to the relative speed of the own vehicle 100 and the other vehicles 200 traveling in the adjacent lane being too large.

In the present embodiment, the correction speed setting unit 336 acquires the average speed Va of the other vehicles 200 traveling in the adjacent lane in step S32, and determines whether to set the target speed Vt to the basic speed Vb or the correction speed Vm based on the average speed Va in step S36. However, the correction speed setting unit 336 may use the lowest speed among the speeds of the other vehicles 200 traveling in the proximity region of the adjacent lane instead of the average speed Va. In this case, the correction speed setting unit 336 acquires the lowest speed in step S32, and determines in step S36 whether to set the target speed Vt to the basic speed Vb or the correction speed Vm based on the lowest speed.

When it is determined that the adjacent lane is congested and that the speed difference between the speed Ve of the own vehicle 100 and the average speed Va of the other vehicles 200 is equal to or more than a second reference value Vref2 that is less than the first reference value Vref1, the acceleration adjustment unit 337 lowers the acceleration for accelerating the own vehicle 100, compared to when the adjacent lane is not congested or when the speed difference is less than the second reference value Vref2.

Figure 7:
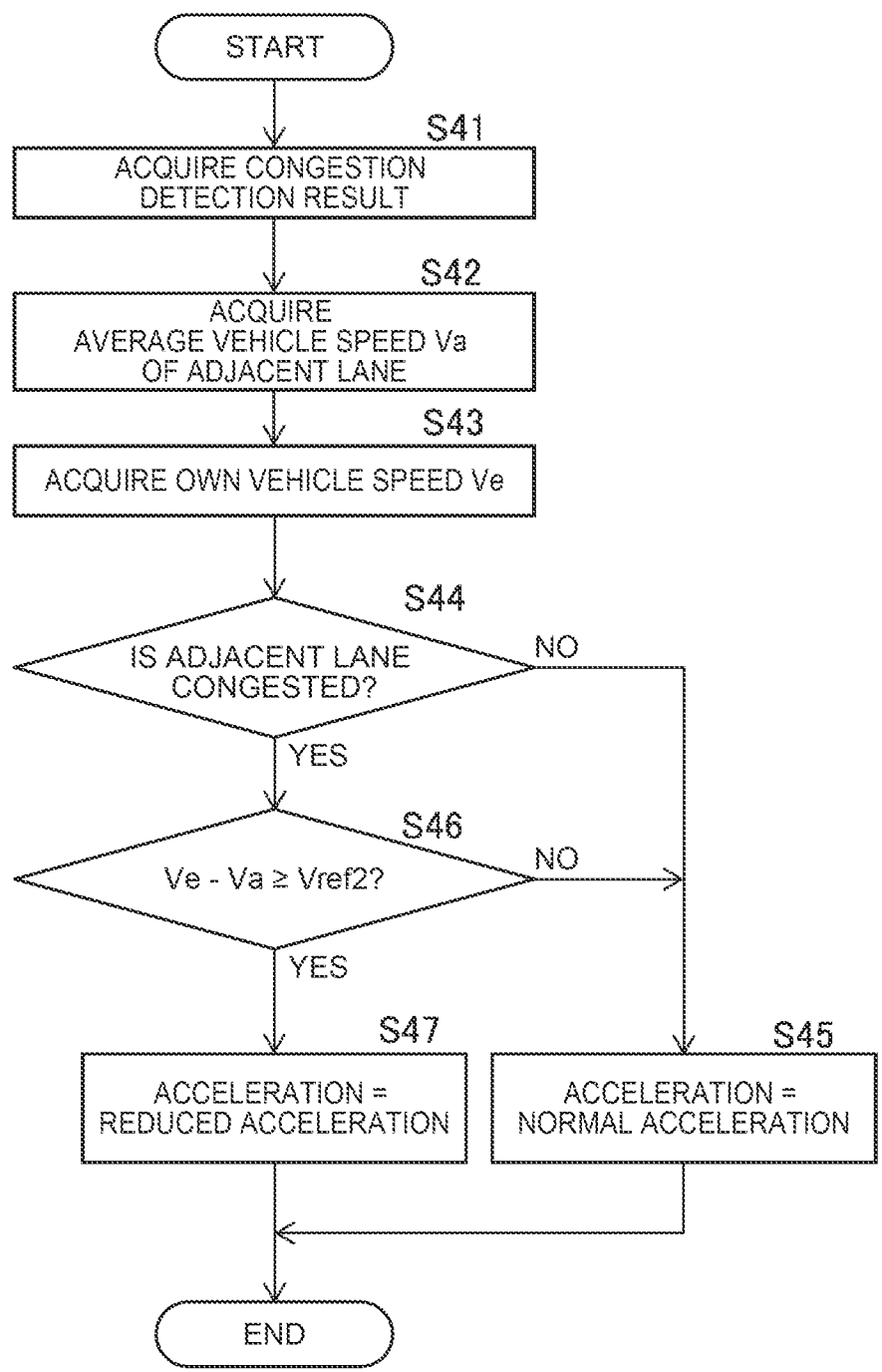
FIG. 7 is a flowchart showing a flow of an acceleration adjusting process for setting an acceleration speed that is performed by an acceleration adjustment unit.

FIG. 7 is a flowchart showing the flow of the acceleration adjustment process for adjusting the acceleration performed by the acceleration adjustment unit 337. The process that is shown is repeatedly executed at predetermined time intervals. Since steps S41 to S44 in FIG. 7 are the same as steps S31 to S34 in FIG. 6, description thereof will be omitted.

When it is determined in step S44 that the adjacent lane is not congested, the acceleration adjustment unit 337 sets the acceleration for when the own vehicle 100 accelerates to the normal acceleration (step S45). The normal acceleration may be a predetermined constant value or a value that changes in accordance with the speed or the like of the own vehicle 100.

When it is determined in step S44 that the adjacent lane is congested, the acceleration adjustment unit 337 determines whether a speed difference ($\Delta V=Ve-Va$) is equal to or greater than the second reference value Vref2, in which the speed difference is obtained by subtracting the average speed Va of the other vehicles 200 acquired in step S42 from the speed Ve of the own vehicle 100 (step S46).

The second reference value Vref2 is a value such that the driver's uneasiness increases when accelerating at a large acceleration, as the speed difference becomes larger than that. The second reference value Vref2 changes according to the values of various parameters. Specifically, similar to the first reference value Vref1, the second reference value Vref2 changes in accordance with the speed of the own vehicle 100, the lateral distance to the other vehicles 200 traveling in the adjacent lane, the speed of the other vehicles 200 traveling in the adjacent lane, and the traveling density of the other vehicles traveling in the adjacent lane. However, the second reference value Vref2 is a value smaller than the first reference value Vref1.

When it is determined in step S46 that the speed difference $\Delta V$ is smaller than the second reference value Vref2, the acceleration adjustment unit 337 sets the acceleration for when the own vehicle 100 accelerates to the normal acceleration (step S45). In contrast, when it is determined in step S46 that the speed difference $\Delta V$ is equal to or more than the second reference value Vref2, the acceleration adjustment unit 337 sets the acceleration for when the own vehicle 100 accelerates to a reduced acceleration (step S47). The reduced acceleration is an acceleration lower than the normal acceleration, and may be a predetermined constant value or a value that changes according to the speed of the own vehicle 100 or the like.

As described above, in the present embodiment, when the adjacent lane is congested and the speed difference $\Delta V$ between the average speed Va of the vehicle traveling in the adjacent lane and the speed Ve of the own vehicle is equal to or more than the second reference value Vref2, the acceleration when the own vehicle 100 accelerates is suppressed to a low level. Thus, the own vehicle 100 is suppressed from suddenly accelerating in a state where the speed difference $\Delta V$ between the average speed Va of the other vehicles 200 traveling in the adjacent lane and the speed Ve of the own vehicle 100 is slightly large. As a result, it is possible to suppress the occupant of the own vehicle 100 from feeling uneasy due to the rapid acceleration of the own vehicle 100 in a state where the relative speed between the own vehicle 100 and the other vehicles 200 traveling in the adjacent lane is high.

In the present embodiment, the acceleration adjustment unit 337 acquires the average speed Va of the other vehicles 200 traveling in the adjacent lane in step S42, and determines whether to set the acceleration to the normal acceleration or the reduced acceleration based on this average speed Va in step S46. However, the acceleration adjustment unit 337 may use the lowest speed among the speeds of the other vehicles 200 traveling in the proximity region of the adjacent lane instead of the average speed Va.

Further, in the above embodiment, the acceleration adjustment unit 337 adjusts the acceleration of when the own vehicle 100 accelerates based on the speed difference between the speed of the own vehicle 100 and the speed of the other vehicles 200. However, the acceleration adjustment unit 337 may adjust a jerk instead of the acceleration. In this case, when the speed difference is equal to or more than the second reference value Vref2, the jerk is reduced as compared with the case where the speed difference is less than the second reference value Vref2.

The control unit 338 controls the speed of the own vehicle 100 so that the speed of the own vehicle 100 becomes the target speed Vt. In particular, the control unit 338 controls the speed Ve of the own vehicle 100 so that the speed Ve becomes the basic speed Vb set by the basic speed setting unit 333 or the correction speed Vm set by the correction speed setting unit 336.

Figure 8:
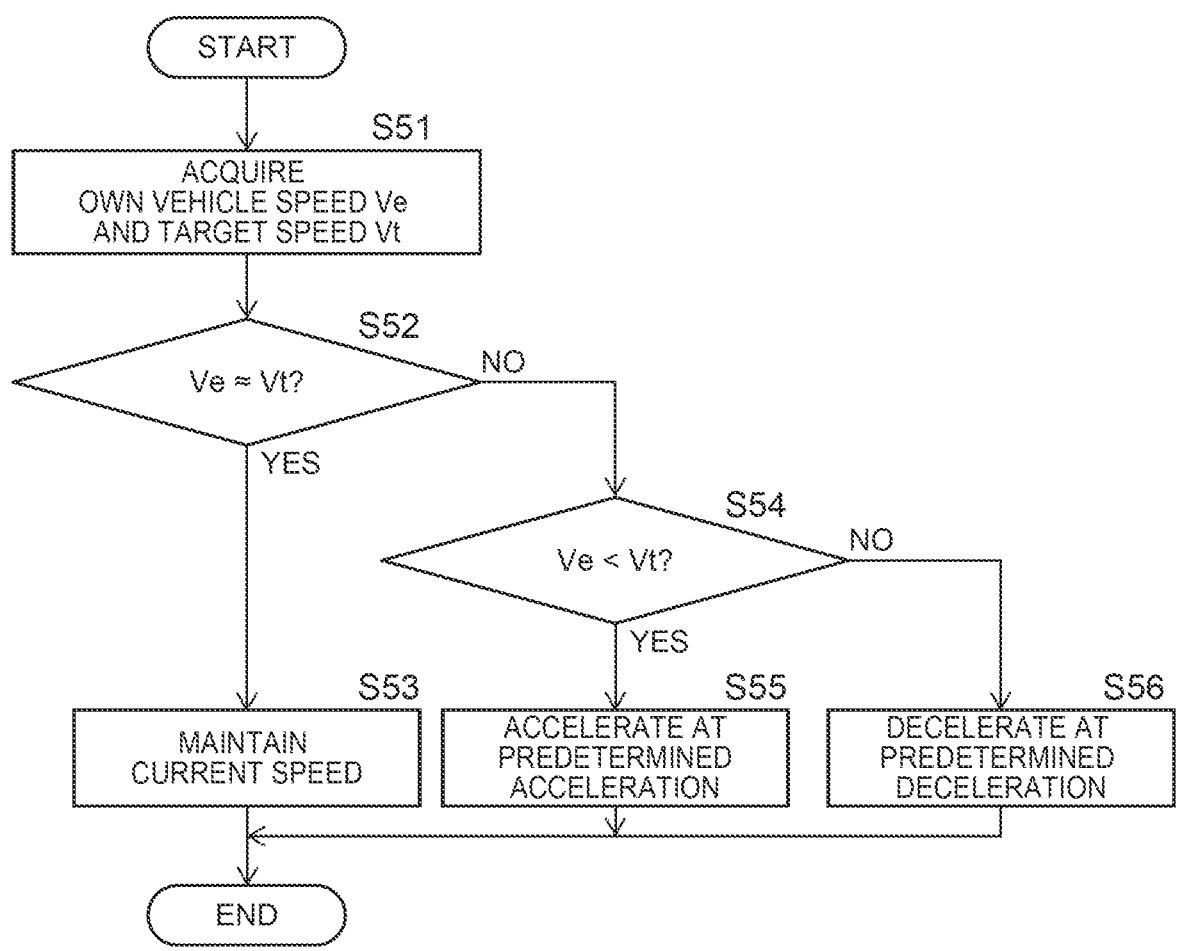
FIG. 8 is a flowchart showing a flow of a speed control process for setting a speed of the own vehicle that is performed by a control unit 338.

FIG. 8 is a flowchart showing a flow of a speed control process for setting a speed of the own vehicle 100 that is performed by the control unit 338. The process that is shown is repeatedly executed at predetermined time intervals.

First, the control unit 338 acquires the speed Ve of the own vehicle 100 from the traveling state sensor 11, and acquires the target speed Vt from the correction speed setting unit 336 (step S51). Next, the control unit 338 determines whether the speed Ve of the own vehicle 100 is substantially the same as the target speed Vt (step S52). When it is determined in step S52 that the speed Ve of the own vehicle 100 is substantially the same as the target speed Vt, the control unit 338 maintains the current speed of the own vehicle 100 (step S53). In contrast, when it is determined in step S52 that the speed Ve of the own vehicle 100 is different from the target speed Vt, the control unit 338 determines whether the speed Ve of the own vehicle 100 is slower than the target speed Vt (step S54).

When it is determined in step S54 that the speed Ve of the own vehicle 100 is slower than the target speed Vt, the control unit 338 accelerates the own vehicle 100 (step S55). At this time, the control unit 338 is accelerated by the acceleration (the normal acceleration or the reduced acceleration) set by the acceleration adjustment process shown in FIG. 7. In contrast, when it is determined in step S54 that the speed Ve of the own vehicle 100 is faster than the target speed Vt, the control unit 338 decelerates the own vehicle 100 (step S56). At this time, the control unit 338 decelerates the own vehicle 100 at a predetermined constant deceleration. Alternatively, the control unit 338 may change the deceleration according to the speed of the own vehicle 100, the speed of the other vehicles 200 traveling in the adjacent lane of the own vehicle 100, and the like.

Although embodiments of the present disclosure have been described above, the present disclosure is not limited to these embodiments, and various modifications and changes can be made within the scope of the claims.

What is claimed is:

1. A speed control device that automatically controls a speed of an own vehicle, the speed control device comprising:
a processor configured to:
set a target speed of the own vehicle to a basic speed that is a set speed set in advance or sets the target speed of the own vehicle to a basic speed that is a speed equal to or less than the set speed in which a distance to a preceding vehicle is maintained at a predetermined distance or more when there is a preceding vehicle;
determine whether there is a congestion in an adjacent lane in which a traveling direction is the same as a traveling direction of a traveling lane of the own vehicle;
detect an average speed or a lowest speed of another vehicle traveling in the adjacent lane;
calculate a correction speed in which a speed difference is equal to or less than a first reference value when the processor determines that the adjacent lane is congested and the speed difference between a speed of the own vehicle and the average speed or the lowest speed of the other vehicle in the adjacent lane that is congested is equal to or more than the first reference value, and sets the target speed of the own vehicle to the correction speed instead of the basic speed when the correction speed is slower than the basic speed; and
lower an acceleration or a jerk for accelerating the own vehicle, when the processor determines that the adjacent lane is congested and the speed difference between the speed of the own vehicle and the average speed or the lowest speed of the other vehicle is equal to or more than a second reference value that is less than the first reference value, compared to when the adjacent lane is not congested or when the speed difference is less than the second reference value.

2. The speed control device according to claim 1, wherein the first reference value is set to a value that is increased as the speed of the own vehicle is increased.

3. The speed control device according to claim 1, wherein the shorter an average lateral distance or a minimum lateral distance between the own vehicle and the other vehicle traveling in the adjacent lane, the smaller a value to which the first reference value is set.

4. The speed control device according to claim 1, wherein the lower the average speed or the lowest speed of the other vehicle traveling in the adjacent lane, the smaller a value to which the first reference value is set.

5. The speed control device according to claim 1, wherein the higher a traveling density of the other vehicle traveling in the adjacent lane, the smaller a value to which the first reference value is set.

6. The speed control device according to claim 1, wherein the correction speed is set so that the speed difference between the speed of the own vehicle and the average speed or the lowest speed of the other vehicle is a specified speed difference less than the first reference value.

7. The speed control device according to claim 6, wherein the higher the speed of the own vehicle, the larger a value to which the specified speed difference is set.

8. The speed control device according to claim 6, wherein the shorter an average lateral distance or a minimum lateral distance between the own vehicle and the other vehicle traveling in the adjacent lane, the smaller a value to which the specified speed difference is set.

9. The speed control device according to claim 6, wherein the lower the average speed or the lowest speed of the other vehicle traveling in the adjacent lane, the smaller a value to which the specified speed difference is set.

10. The speed control device according to claim 6, wherein the higher a traveling density of the other vehicle traveling in the adjacent lane, the smaller a value to which the specified speed difference is set.

* * * * *